May 19, 1931.  R. S. ALLAN  1,805,537
NONCORRODIBLE FAUCET
Filed March 21, 1928
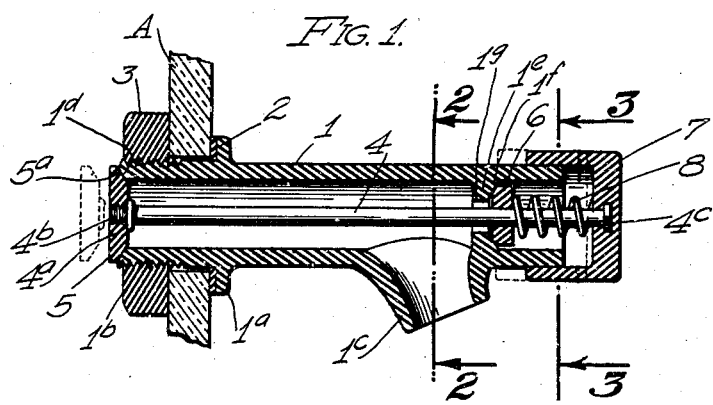
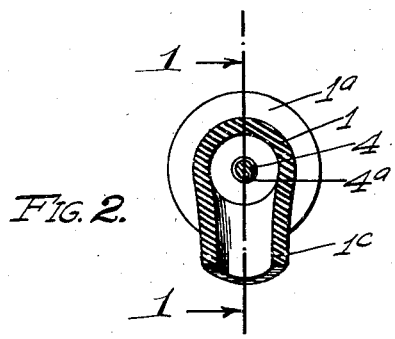
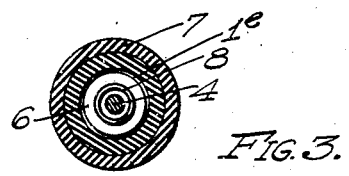
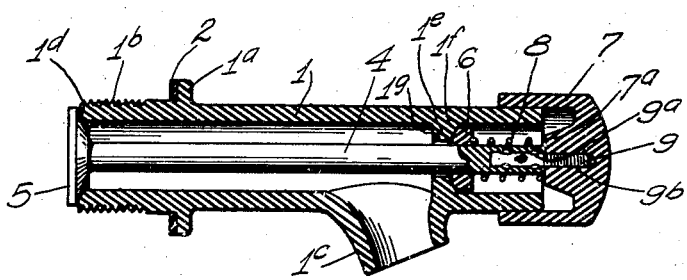
INVENTOR.
RONALD S. ALLAN
BY A. B. Bowman
ATTORNEY Patented May 19, 1931

1,805,537

UNITED STATES PATENT OFFICE

RONALD S. ALLAN, OF LOS ANGELES, CALIFORNIA

NONCORRODIBLE FAUCET

Application filed March 21, 1928. Serial No. 263,392.

My invention relates to non-corrodible valves, and the objects of my invention are: first, to provide a valve of this class adapted to be connected to containers from which are dispensed water, fruit juices, or other liquid normally acting deleteriously on metals of which ordinary faucets are constructed; second, to provide a faucet of this class which is particularly simple and economical of construction and the principal parts thereof moulded in an economical manner from non-corrodible material, and also a valve of this class having very few parts; third, to provide a valve of this class having a valve at its inner end which is adapted to be released when dispensing the liquid, and which is provided with another valve seated at the opposite end of the valve casing to exclude the liquid from the outer end of the casing; fourth, to provide a valve of this class in which the several movable portions are economically connected to the valve actuating rod; and, fifth, to provide as a whole a novelly constructed valve of this class, one which is durable and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a longitudinal sectional view of my valve in one form of construction, showing the same secured to the wall of a dispensing container, or other supply means, the section being taken through 1—1 of Fig. 2; Figs. 2 and 3 are transverse sectional views thereof taken, respectively, through 2—2 and 3—3 of Fig. 1, and Fig. 4 is a longitudinal sectional view of a slightly modified form of construction thereof.

Like characters of reference refer to similar parts and portions throughout the several views of the drawings.

My valve, as shown in Figs. 1, 2, and 3 of the drawings, consists essentially of a valve casing 1, a sealing gasket 2, securing nut 3, a valve rod 4, valve 5, sealing member 6, an actuating button 7, and a spring 8.

The valve casing 1 is tubular in construction and is moulded from bakelite. The casing is provided near one end with a limiting and sealing annular flange 1a. Between said flange and said end of the casing are provided threads 1b on which is mounted a securing nut 3 for securing the wall of a container A between the flange 1a and the nut. A gasket 2 is preferably positioned between the flange 1a and the wall of the container.

Intermediate the ends of the casing and outwardly from the flange 1a is provided an outwardly and angularly directed discharge spout 1c which communicates with the interior of the casing.

Within, and extending longitudinally with the axis of the casing, is reciprocally mounted a valve actuating rod 4 which is preferably made of a non-corrodible material, such as German silver. At the inner end of said rod is provided a shoulder 4a and a threaded portion 4b between said shoulder and said end of the rod. On this threaded portion is screwably secured a valve member 5 which is also made of bakelite and provided with a beveled valve seat 5a. The beveled portion of this valve is adapted to engage a beveled valve seat 1d at the inner end of the valve casing. To the opposite or outer end of the valve rod is secured a button 7 which is also made of bakelite and moulded in the form of a cap which is reciprocally mounted over the outer end of and around the outer side of the valve casing. This button is secured to the valve rod by moulding the same thereon around an enlarged head 4c at the outer end of the rod.

Within the casing and intermediate the discharge spout 1c and the outer end of the casing, is provided a partition 1e which is provided with a central bore 1g and at its outer side with a seat 1f. This bore 1g is sufficiently large to permit the shoulder 4a at the inner end of the rod to pass therethrough. Around the rod 4 is mounted a collar or sealing member 6 which is adapted to engage the seat 1f on the partition 1e to prevent the liquid being dispensed from the valve from entering the compartment at the outer end of the casing. Around the rod and intermediate the sealing member 6 and the cap 7, is positioned a compression spring 8, preferably made of German silver, which normally forces the cap outwardly and the valve 5 against its seat and also the sealing member 6 against its seat. The sealing member 6 is also made of non-corrodible material, such as bakelite. It will be here noted that the sealing member 6 serves as a guide for the rod 4 and may easily be removed and replaced in case the same becomes worn around the rod.

In the structure shown in Fig. 4, the casing 1 is identical to that shown in Figs. 1, 2 and 3, but the valve rod is made of bakelite and moulded integrally with the valve 5. In the outer end of the valve rod in the latter construction is also moulded a metal stud 9 which is preferably provided, in the end moulded in the valve rod, with key portions 9a to prevent the stud from rotating relative to the valve rod. The outer end of the stud is provided with threads 9b over which the cap 7 is screwed, the cap being provided with an inwardly extending axial boss 7a for increasing the thickness thereof for receiving the stud and also providing a shoulder for the spring 8 for decreasing the length of the spring.

Though I have shown and described a particular construction, combination and arrangement of parts and portions, and a certain modification, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a valve of the class described, a non-corrodible non-metallic tubular casing having securing means at one end and a valve seat in said end, and a discharge spout intermediate its ends, a non-corrodible non-metallic valve rod reciprocally mounted within said casing, guide means within and intermediate the ends of said casing through which said rod extends, a non-corrodible non-metallic valve secured to the one end of said rod adapted to engage said seat, a valve button reciprocally mounted on the opposite end of said casing and connected with the opposite end of said rod, and a spring mounted within said casing in engagement with said button adapted to force the same outwardly and said valve against its seat.

2. In a valve of the class described, a non-corrodible non-metallic tubular valve casing having securing means at one end and a valve seat at said end and a discharge spout extending therefrom intermediate its ends, a non-corrodible non-metallic valve rod reciprocally mounted in said casing, said casing having in its interior a partition with a large bore through which said rod freely extends, a non-corrodible non-metallic sealing member mounted on said rod outwardly from said partition and adapted to engage the same, a non-corrodible non-metallic valve integrally molded to the inner end of said rod and adapted to engage said valve seat, the outer end of the valve rod having non-rotatably moulded therein a screw stud, and a button reciprocally mounted on the outer end of said casing and secured to said stud and against the outer end of said rod for forcing said second valve from its seat, and a spring positioned in said casing between said sealing member and said button for normally forcing said button outwardly and said valve against its seat.

In testimony whereof, I have hereunto set my hand at Los Angeles, California, this 7th day of March, 1928.

RONALD S. ALLAN.